US011866324B2

(12) United States Patent
Kang et al.

(10) Patent No.: US 11,866,324 B2
(45) Date of Patent: *Jan. 9, 2024

(54) METHOD FOR MANUFACTURING AEROGEL BLANKET

(71) Applicant: LG CHEM, LTD., Seoul (KR)

(72) Inventors: Tae Gyeong Kang, Daejeon (KR); Se Won Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 17/056,872

(22) PCT Filed: Nov. 27, 2019

(86) PCT No.: PCT/KR2019/016441
§ 371 (c)(1),
(2) Date: Nov. 19, 2020

(87) PCT Pub. No.: WO2020/111763
PCT Pub. Date: Jun. 4, 2020

(65) Prior Publication Data
US 2021/0155486 A1    May 27, 2021

(30) Foreign Application Priority Data
Nov. 27, 2018 (KR) .......................... 10-2018-0147974

(51) Int. Cl.
*C01B 33/158* (2006.01)
*B01J 13/00* (2006.01)
(Continued)

(52) U.S. Cl.
CPC ....... *C01B 33/1585* (2013.01); *B01J 13/0091* (2013.01); *C01B 33/141* (2013.01); *C01B 33/152* (2013.01)

(58) Field of Classification Search
CPC . C01B 33/1585; C01B 33/141; C01B 33/152; B01J 13/0091
See application file for complete search history.

(56) References Cited

U.S. PATENT DOCUMENTS 6,364,953 B1   4/2002  Kawakami et al.
6,799,442 B1   10/2004 Costa et al.
(Continued)

FOREIGN PATENT DOCUMENTS

CN      107848815      3/2018
EP      2813338 A1     12/2014
(Continued)

OTHER PUBLICATIONS

Kim et al. KR101953349B1 English Translate (Year: 2017).*
Tsukahara et al. WO2017145359A1 English Translate (Year: 2017).*
Latifi_2018_Mater._Res._Express_5_055020 (Year: 2018).*

*Primary Examiner* — Brian D Walck
*Assistant Examiner* — Jordan W Taylor
(74) *Attorney, Agent, or Firm* — Bryan Cave Leighton Paisner LLP (57) ABSTRACT

A method for manufacturing an aerogel blanket, the method capable of simplifying manufacturing equipment by performing gelation while rotating a reaction vessel, improving manufacturing efficiency by controlling manufacturing time regardless of the thickness of an aerogel blanket and improving thermal conductivity by uniformly forming an aerogel in a substrate for blanket.

10 Claims, 3 Drawing Sheets

(51) Int. Cl.
  *C01B 33/141* (2006.01)
  *C01B 33/152* (2006.01)

(56) References Cited

U.S. PATENT DOCUMENTS

| | | |
|---|---|---|
| 2005/0046086 A1 | 3/2005 | Lee et al. |
| 2005/0167891 A1 | 8/2005 | Lee et al. |
| 2007/0095107 A1 | 5/2007 | Solinas et al. |
| 2008/0093016 A1 | 4/2008 | Lee et al. |
| 2014/0044929 A1 | 2/2014 | Evans et al. |
| 2014/0273701 A1 | 9/2014 | Samanta et al. |
| 2016/0096949 A1 | 4/2016 | Evans et al. |
| 2016/0333572 A1 | 11/2016 | Samanta et al. |
| 2017/0266920 A1* | 9/2017 | Oikawa ............... F16L 59/026 |
| 2018/0072578 A1 | 3/2018 | Kim et al. |
| 2018/0086587 A1 | 3/2018 | Kim et al. |
| 2018/0094114 A1 | 4/2018 | Evans et al. |
| 2018/0112057 A1 | 4/2018 | Evans et al. |
| 2018/0112058 A1 | 4/2018 | Evans et al. |
| 2018/0134867 A1 | 5/2018 | Evans et al. |
| 2018/0147811 A1 | 5/2018 | Oh et al. |
| 2018/0148888 A1 | 5/2018 | Kim et al. |
| 2018/0179073 A1 | 6/2018 | Oh et al. |
| 2018/0179074 A1 | 6/2018 | Kim et al. |
| 2018/0244029 A1 | 8/2018 | Kim et al. |
| 2018/0326700 A1 | 11/2018 | Kim |
| 2019/0010060 A1 | 1/2019 | Oh et al. |
| 2019/0203014 A1 | 7/2019 | Evans et al. |
| 2020/0308011 A1 | 10/2020 | Kim et al. |

FOREIGN PATENT DOCUMENTS

| | | |
|---|---|---|
| EP | 3260417 A1 | 12/2017 |
| EP | 3284720 A1 | 2/2018 |
| EP | 3296264 A1 | 3/2018 |
| JP | H09-227131 | 9/1997 |
| JP | 2001-007100 | 1/2001 |
| JP | 2003-513873 | 4/2003 |
| JP | 2006-525931 | 11/2006 |
| JP | 2015-524491 | 8/2015 |
| KR | 10-2001-0104372 | 11/2001 |
| KR | 10-0908399 | 7/2009 |
| KR | 10-2012-0070948 | 7/2012 |
| KR | 10-2015-0122196 | 10/2015 |
| KR | 10-1654795 | 9/2016 |
| KR | 10-2017-0063800 | 6/2017 |
| KR | 10-1748532 | 6/2017 |
| KR | 10-2017-0098141 | 8/2017 |
| KR | 10-2017-0098592 | 8/2017 |
| KR | 101953347 B1 * | 8/2017 |
| KR | 10-2017-0112985 | 10/2017 |
| WO | 2016-167494 | 10/2016 |
| WO | WO-2017145359 A1 * | 8/2017 |
| WO | 2018-070752 | 4/2018 |

* cited by examiner

METHOD FOR MANUFACTURING AEROGEL BLANKET

CROSS-REFERENCE TO RELATED APPLICATIONS

This application is a National Stage Application of International Application No. PCT/KR2019/016441 filed Nov. 27, 2019, which claims the benefit of Korean Patent Application No. 10-2018-0147974, filed on Nov. 27, 2018, in the Korean Intellectual Property Office, the disclosure of which is incorporated herein in its entirety by reference.

TECHNICAL FIELD

The present invention relates to a method for manufacturing an aerogel blanket including a step of gelation while rotating a reaction vessel and to a high thermal insulation aerogel blanket manufactured by the method.

BACKGROUND

An aerogel is a super-porous, high specific surface area ($\geq 500$ m$^2$/g) material having a porosity of about 90-99.9% and a pore size in the range of 1-100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic heat insulation material such as Styrofoam, and that fire vulnerability and the generation of harmful gases in case of occurrence of fire which are fatal weaknesses of the organic insulation material can be solved.

In general, the aerogel is produced by preparing a hydrogel from a precursor material, and removing a liquid component inside the hydrogel without destroying a microstructure. An aerogel may be typically classified into three types, i.e., powder, granule, and monolith, and the silica aerogel is generally produced in the form of powder.

The above powder-type silica aerogel may be made into a composite with fibers and be commercialized in the form of an aerogel blanket or an aerogel sheet. Such an aerogel blanket and an aerogel sheet may be bent, folded, or cut in any size or shape due to the flexibility thereof. Therefore, the powder-type silica aerogel may be applied not only to industrial applications such as thermal insulation panels for LNG carriers, industrial insulation materials, spacesuits, transportation, vehicles, and insulation materials for electric power production, but also to household goods such as jackets and sports shoes. In addition, when an aerogel is used in fireproof doors as well as roofs and floors in housing such as an apartment, there is a great effect in fire prevention.

Specifically, an aerogel blanket in the present specification is a concept referring to a material in which an aerogel is impregnated on a substrate for the blanket such as a fiber, and a method for manufacturing the aerogel blanket is divided into a gel casting method and a method for preparing aerogel powder or granules and then depositing the same on a substrate for the blanket using a binder.

Products manufactured by the gel casting method account for the majority of the usage to date because of the good physical properties thereof, and currently, a gel casting method using a roll-to-roll technique is known as a commercially available technology. However, in order to manufacture an aerogel blanket by the roll-to-roll technique, a conveyor belt must be included in the equipment to cast a catalyzed sol and the like on a substrate and to ensure complete gelation, and the conveyor belt must be extended until the gelation is completed, so that there is a problem in that the equipment scale becomes massive in a mass production stage. In addition, there is a problem in that as an aerogel blanket to be manufactured becomes longer, so does a conveyor belt, and therefore, gelation time is increased, thereby increasing the overall manufacturing time. In particular, when an aerogel blanket becomes thinner, the length thereof is increased, thereby increasing manufacturing time, so that there is a problem in that the manufacturing time is affected by the thickness and length of the blanket.

Therefore, when it comes to a method for manufacturing an aerogel blanket, there is a need for research on a method for manufacturing an aerogel blanket, the method which is capable of simplifying manufacturing equipment while increasing manufacturing process efficiency, and which may be commercialized in a mass production process since manufacturing time is not greatly affected by the thickness and the length of the aerogel blanket.

PRIOR ART DOCUMENT

Patent Document (Patent Document 1) Korean Patent Application Publication No. 10-2012-0070948 (published on Jul. 2, 2012)

DISCLOSURE OF THE INVENTION

Technical Problem

In manufacturing an aerogel blanket by a gel casting method, an aspect of the present invention is to provide a method for manufacturing an aerogel blanket, the method capable of greatly reducing manufacturing time by performing gelation while rotating a reaction vessel during a gelation process and simplifying manufacturing equipment without allowing the manufacturing time to be affected by the thickness and length of the aerogel blanket.

Another aspect of the present invention is to provide a method for manufacturing an aerogel blanket, the method capable of allowing an aerogel to be uniformly formed in a substrate for blanket by rotating a reaction vessel, thereby improving the thermal conductivity of the aerogel blanket to be manufactured.

Another aspect of the present invention is to provide a method for manufacturing an aerogel blanket, the method capable of further improving the uniformity of an aerogel to be formed in a substrate for the blanket by controlling the rotation rate of a reaction vessel, thereby allowing the thermal conductivity of the entire aerogel blanket to be uniform.

Another aspect of the present invention is to provide a high thermal insulation aerogel blanket manufactured by the method for manufacturing an aerogel blanket.

Technical Solution

According to an aspect of the present invention, there is provided a method for manufacturing an aerogel blanket, the method including introducing a catalyzed sol and a substrate for the blanket into a reaction vessel (Step 1), and performing gelation while rotating the reaction vessel (Step 2), wherein the substrate for the blanket is a porous substrate.

According to another aspect of the present invention, there is provided a method for manufacturing an aerogel blanket, wherein the reaction vessel in Step 2 is rotated at a rate of 10 rpm to 400 rpm.

Advantageous Effects

A manufacturing method of the present invention may greatly reduce manufacturing time by performing gelation while rotating a reaction vessel during a gelation process and simplifying manufacturing equipment without allowing the manufacturing time to be affected by the thickness and length of an aerogel blanket.

In addition, since an aerogel is allowed to be uniformly formed in a substrate for the blanket by rotating a reaction vessel, it is possible to manufacture an aerogel blanket having uniform thickness and greatly improved thermal conductivity.

In addition, the uniformity of an aerogel to be formed is further improved by controlling the rotation rate of a reaction vessel, thereby allowing a catalyzed sol to be uniformly impregnated in a substrate for the blanket, and thus, it is possible to manufacture an aerogel blanket having uniform thermal conductivity overall.

DETAILED DESCRIPTION

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for manufacturing an aerogel blanket according to an embodiment of the present invention includes (Step 1) introducing a catalyzed sol and a substrate for the blanket into a reaction vessel and (Step 2) performing gelation while rotating the reaction vessel, and at this time, the substrate for the blanket is a porous substrate.

Hereinafter, each step of the method for manufacturing an aerogel blanket of the present invention will be described in detail.

Step 1

Step 1 according to an embodiment of the present invention is a step of preparation for forming an aerogel blanket, the step in which a catalyzed sol is prepared and then the catalyzed sol and a substrate for the blanket are introduced into a reaction vessel. Specifically, it is to impregnate a catalyzed sol on a substrate for the blanket.

In the present invention, the catalyzed sol may be prepared by mixing a sol and a base catalyst, and the base catalyst serves to promote gelation in Step 2 by increasing the pH of the sol.

At this time, the sol is not limited as long as it is a material capable of forming a porous gel by a sol-gel reaction, and specifically, may include an inorganic sol, an organic sol, or a combination thereof. The inorganic sol may include zirconia, yttrium oxide, hafnia, alumina, titania, ceria, silica, magnesium oxide, calcium oxide, fluorinated magnesium, fluorinated calcium, and combinations thereof, and the organic sol may be polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof. In addition, in terms of securing excellent miscibility with a substrate for the blanket, further improving porosity when being formed as a gel, and manufacturing an aerogel blanket having low thermal conductivity, the sol may be preferably a silica sol.

When the catalyzed sol according to an embodiment of the present invention is a catalyzed silica sol, in Step 1, the catalyzed silica sol may be prepared by mixing a silica sol and a base catalyst, and here, the silica sol may be prepared by mixing a silica precursor with alcohol. In addition, the silica sol may undergo hydrolysis at a low pH to facilitate gelation.

A silica precursor which may be used for preparing the silica sol may be an alkoxide-based compound containing silicon, specifically, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among the above, the silica precursor according to an embodiment of the present invention may more specifically be tetraethyl orthosilicate (TEOS).

The silica precursor may be used in an amount such that the content of silica ($SiO_2$) contained in the silica sol is 3 wt % to 30 wt %. When the content of silica is within the above range, the content of the silica aerogel in a blanket to be finally manufactured is sufficient, so that the desired level of thermal insulation effect may be achieved, and also, the mechanical properties of the blanket, especially an excellent level of flexibility may be obtained. In addition, alcohol which may be used for preparing the silica sol of the present invention may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, and any one thereof or a mixture of two or more thereof may be used. When considering the miscibility with water and an aerogel, the alcohol may be a monohydric alcohol having 1 to 6 carbon atoms such as methanol, ethanol, isopropanol, and butanol.

The alcohol as described above may be used in an appropriate amount in consideration of a silica aerogel to be finally manufactured.

The silica sol according to an embodiment of the present invention may include a silica precursor and water in a molar ratio of 1:4 to 1:1. In addition, a silica precursor and alcohol may be included in a weight ratio of 1:2 to 1:9, and preferably, may be included in a weight ratio of 1:4 to 1:6. When a silica precursor solution satisfies the above weight ratio, there is an improvement effect in terms of thermal insulation performance.

Also, a base catalyst which may be used in the catalyzed sol according to an embodiment of the present invention may be an inorganic base such as sodium hydroxide and potassium hydroxide, or an organic base such as ammonium hydroxide. Specifically, the base catalyst may be one or more selected from the group consisting of sodium hydroxide (NaOH), potassium hydroxide (KOH), calcium hydroxide (Ca(OH)$_2$), ammonia (NH$_3$), ammonium hydroxide (NH$_4$OH), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylamino-ethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or mixtures thereof.

The base catalyst may be included in an amount such that the pH of the sol is 7 to 11. When the pH of the sol satisfies the above range, gelation may be smoothly performed. In addition, since the base may be precipitated when introduced in a solid phase, it may be preferable that the base is added in the form of a solution diluted with the alcohol described above. At this time, the dilution ratio of the base catalyst and alcohol may be 1:4 to 1:100 based on volume.

Also, a substrate for the blanket according to an embodiment of the present invention may specifically be a porous substrate in terms of improving the thermal insulation properties of an aerogel blanket. When a porous substrate for the blanket is used, a catalyzed sol is allowed to easily penetrate into the substrate, and thus, forms an aerogel uniformly inside the substrate for the blanket, so that an aerogel blanket manufactured may have excellent thermal insulation properties.

The porous substrate for the blanket which may be used according to an embodiment of the present invention may be a film, a sheet, a net, a fiber, a foam, a non-woven body, or a laminate of two or more layers thereof. Also, according to the use thereof, the porous substrate for the blanket may have surface roughness formed or patterned on the surface thereof. More specifically, the porous substrate for the blanket may be a fiber capable of further improving thermal insulation performance by including a space or a void through which an aerogel may be easily inserted into the porous substrate for the blanket. Furthermore, it may be preferable that the porous substrate for the blanket has low thermal conductivity.

Specifically, the porous substrate for the blanket may be polyamide, polybenzimidazole, polyaramid, an acryl resin, a phenol resin, polyester, polyetheretherketone (PEEK), polyolefin (for example, polyethylene, polypropylene, a copolymer thereof, or the like), cellulose, carbon, cotton, wool, hemp, a non-woven fabric, a glass fiber, ceramic wool, or the like. More specifically, the porous substrate for the blanket in the present invention may be a glass fiber.

According to an embodiment of the present invention, a reaction vessel into which a catalyzed sol and a substrate for the blanket are introduced may be a reaction vessel for performing gelation, and a vessel in any shape such a polygon and a cylinder may be used as long as it is a vessel which may be rotated with the catalyzed sol and the substrate for the blanket therein. However, a cylindrical reaction vessel may be preferably used in terms of facilitating the introduction of a long substrate for the blanket and the rotation during a gelation reaction.

In addition, according to an embodiment of the present invention, the order of introducing a catalyzed sol and a substrate for the blanket into the reaction vessel is not limited. For example, the catalyzed sol may be first introduced and then the substrate for the blanket may be introduced, or the substrate for the blanket may be first introduced and then the catalyzed sol may be introduced. Alternatively, the catalyzed sol and the substrate for the blanket may be simultaneously introduced, or the impregnation may be performed by soaking the substrate for the blanket with the catalyzed sol. At this time, in order to improve the bonding of the substrate for the blanket band the catalyzed sol, the substrate for the blanket may be lightly pressed down to be sufficiently impregnated. Thereafter, the substrate for the blanket may be pressed at a constant pressure to a predetermined thickness to remove excess sol, thereby shortening drying time.

In addition, the substrate for the blanket may be introduced in an appropriate form which facilitates the introduction according to the shape of a reaction vessel. Specifically, a substrate for the blanket wound in the form of a roll may be introduced into the reaction vessel.

In addition, the catalyzed sol and the substrate for the blanket may be introduced in an amount, specifically in an amount of 1-100% of the internal volume of the reaction vessel, respectively, and in terms of shortening the gelation time in Step 2 and uniformly forming an aerogel inside the substrate for the blanket, may be introduced in an amount of 1-60% of the volume of the reaction vessel, more specifically 10-60%, even more preferably 30-60%, respectively.

According to an embodiment of the present invention, the catalyzed sol may be introduced in an amount of 80-120%, preferably 90-110%, based on the volume of the substrate for the blanket. In addition, preferably, the introduction amount of the substrate for the blanket and the catalyzed sol may satisfy the above introduction ratio therebetween under the conditions satisfying the introduction amount with respect to the reaction vessel. When a catalyzed sol satisfies the introduction ratio (introduction amount) with respect to the volume of a substrate for the blanket, the catalyzed sol is more uniformly impregnated on the substrate for the blanket, so that an aerogel blanket to be manufactured may have more uniform physical properties, and since the catalyzed sol may all be impregnated on the substrate for the blanket, it is possible to prevent the loss of raw materials and prevent a problem in which the catalyzed sol is gelled alone.

Step 2 according to an embodiment of the present invention is to manufacture a wet gel blanket (get blanket composite), and may be performed by a gelation reaction while rotating a reaction vessel in the state in which a catalyzed sol is impregnated on a substrate for the blanket.

In the present invention, the gelation may be to form a network structure from a catalyzed sol, wherein the network structure may represent a planar mesh structure in which specific polygons having one or more types of atomic arrangement are linked to each other, or a structure in which specific polyhedrons share their vertices, edges, faces, and the like with each other to form a three-dimensional skeleton structure.

According to an embodiment of the present invention, a gelation reaction may be performed after sealing a reaction vessel into which a catalyzed sol and a substrate for the blanket are introduced. Also, the reaction vessel may be rotated by disposing the long axis thereof in a lateral direction, that is, in a horizontal direction, and specifically, a cylindrical reaction vessel may be laid down and rotated. That is, the rotating axis of a reaction vessel of the present invention may be horizontal.

According to an embodiment of the present invention, a reaction vessel may be mounted on an apparatus for rotating a reaction vessel and then rotated. At this time, the type of an apparatus for rotating a reaction vessel is not limited, and any apparatus known in the art may be used as long as the apparatus is capable of rotating.

According to an embodiment of the present invention, gelation may be performed while rotating the reaction vessel at a rotation rate of 10 rpm to 400 rpm, 15 rpm to 325 rpm, 30 rpm to 300 rpm, 30 rpm to 200 rpm, or 100 rpm to 200 rpm. When the reaction vessel satisfies the rotation rate in the above range, a sol may be evenly impregnated on a substrate for the blanket, so that an aerogel is more uniformly formed during gelation. Accordingly, it is possible to secure very uniform thermal conductivity throughout an aerogel blanket and there is an advantage in that the safety of a process for manufacturing the aerogel blanket by increasing the stability of a reaction vessel and an apparatus for rotating the reaction vessel.

In the present invention, a catalyzed sol and a substrate for the blanket are all put into a reaction vessel to be gelled to manufacture an aerogel blanket, so that unlike a roll-to-roll method, which has been typically applied, a moving element such as a conveyor belt is not separately required, and thus there is an advantage in that a space for use during manufacturing may be greatly saved. In addition, when a substrate for blanket is disposed on a moving element and then a silica sol is applied on the substrate for blanket, followed by continuously moving the moving element to perform gelation as in the roll-to-roll method, the gelation is not performed on the entire substrate for blanket at the same time but is performed sequentially over time while continuously supplying the substrate for the blanket and a catalyzed sol, so that even if a substrate for the blanket having the same thickness and length is used, there is a problem in that gelation takes much longer than a gelation process according to an embodiment of the present invention. Specifically, the longer the substrate for the blanket, the more noticeable the problem that gelation process time becomes longer in order to sufficiently achieve gelation on the entire substrate for the blanket. However, according to an embodiment of the present invention, the gelation of a sol is simultaneously achieved on the entire substrate for the blanket, manufacturing time may be significantly reduced. In addition, the length and thickness of the substrate for the blanket do not affect gelation time, so that even if a long substrate for the blanket is used, the manufacturing time is significantly reduced to maximize manufacturing efficiency.

In addition, according to an embodiment of the present invention, since gelation is performed while rotating a reaction vessel, centrifugal force and centripetal force are applied. Therefore, compared to a roll-to-roll method in which a reaction vessel is not rotated or gelation is performed on a moving element, an aerogel blanket in which an aerogel is more uniformly dispersed may be manufactured, so that the thickness of the manufactured aerogel blanket is the same or very similar to the thickness of a substrate for the blanket, and there is an effect in that thermal insulation properties are excellent.

In addition, the manufacturing method according to an embodiment of the present invention may perform an aging step as a process for allowing a chemical change to be completely achieved by leaving the wet gel blanket to stand at a suitable temperature. The aging step may more firmly form the formed network structure, and thus, may enhance the mechanical stability of the aerogel blanket of the present invention.

The aging step of the present invention is performed by adding a solution in which a basic catalyst such as sodium hydroxide (NaOH), potassium hydroxide (KOH), ammonium hydroxide ($NH_4OH$), triethylamine, pyridine, and the like is diluted in an organic solvent at a concentration of 1-10%. Therefore, a Si—O—Si bonding in an aerogel is induced to the maximum to allow the network structure of a gel to be more firm, so that there is an effect of facilitating the maintenance of the pore structure in a quick drying process to be performed later. At this time, the organic solvent may be the alcohol described above, and specifically, may include ethanol.

Also, the aging step should be performed in a suitable temperature range to enhance the optimal pore structure. The aging step of the present invention may be performed by leaving the wet gel blanket to stand for 1-10 hours at a temperature of 30-70° C. When the aging temperature satisfies the above range, aging efficiency may be further improved to increase productivity. Also, when ethanol is used as an organic solvent, the above temperature range is a temperature range below the boiling point of the ethanol, so that it is possible to prevent the solvent loss due to evaporation.

In addition, according to an embodiment of the present invention, a surface modification step may be further performed to manufacture a hydrophobic aerogel blanket.

When a hydrophilic functional group present on the surface of an aerogel is substituted with a hydrophobic functional group, the shrinkage of pores due to the surface tension of a solvent during the drying of the aerogel may be minimized by the repulsive force between hydrophobic functional groups. The dried aerogel maintains low thermal conductivity immediately after being dried. However, since a hydroxy functional group present on the surface of an aerogel, for example, when the aerogel is a silica aerogel, a hydrophilic silanol group (Si—OH) present on the surface of silica absorbs water in the air, there is a disadvantage in that thermal conductivity is gradually increased. Therefore, in order to maintain low thermal conductivity, there is a need to modify the surface of the aerogel to be hydrophobic.

Accordingly, the surface modification according to an embodiment of the present invention may be performed by a surface modifier including a polar solvent and an organosilane compound.

As the polar solvent, methanol, ethanol, isopropyl alcohol, or the like may be used, and as the organosilane compound, trimethylchlorosilane (TMCS), hexamethyldisilazane (HMDS), methyltrimethoxysilane, trimethyl-ethoxysilane, ethyltriethoxysilane, phenyltriethoxy-silane, or the like may be used. Specifically, hexamethyldisilazane may be used.

In the surface modification, it is preferable that the solvent is preferably mixed at a volume ratio of 1 to 10 with respect to the gel, and the organosilane compound is mixed at a volume ratio of 0.1 to 10 with respect to the gel. When the volume ratio of the organosilane compound satisfies the above range, optimal reaction time may be obtained, and the surface modification is performed using an appropriate amount of a surface modifier, so that the problem of cost rise is solved and the phenomenon in that the gel structure is contracted during drying by the residual unreacted surface modifier is prevented.

In addition, according to an embodiment of the present invention, the aging step and the surface modification step may be performed in a separate reaction vessel after recovering a silica wet gel blanket completed with gelation, or may be performed inside a reaction vessel in which gelation has been performed. In terms of the efficiency of a process and the simplification of equipment, the aging and surface modification steps may be preferably performed in the reaction vessel in which gelation has been performed.

In addition, the hydrophobic wet gel blanket according to an embodiment of the present invention may be dried to manufacture a hydrophobic aerogel blanket.

Meanwhile, the manufacturing method according to an embodiment of the present invention may further perform a washing step before the drying. The washing is a step for removing impurities (sodium ions, unreacted substances, by-products, and the like) generated during the reaction and residual ammonia, which may generate an ammonium carbonate salt by reacting with $CO_2$ during supercritical drying, and the like in order to obtain a hydrophobic silica aerogel with high purity, and may be performed by a dilution process or an exchange process using a non-polar organic solvent.

The drying step according to an embodiment of the present invention may be performed through a process for removing a solvent while maintaining the pore structure of an aged gel, and the drying step may be performed by a supercritical drying process or an atmospheric drying process.

The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

Specifically, the supercritical drying process performed a solvent substitution process in which an aged wet gel blanket is placed into a supercritical drying reactor, and then $CO_2$ in a liquid state is filled therein, followed by substituting an alcohol solvent inside the wet gel with $CO_2$. Thereafter, the temperature is raised to 40-70° C. at a predetermined temperature raising rate, specifically, 0.1° C./min to 1° C./min, and the pressure which is greater than a pressure at which carbon dioxide becomes to be a supercritical state, specifically, the pressure of 100 bar to 150 bar is maintained to allow the carbon dioxide to remain in the supercritical state for a predetermined amount of time, specifically for 20 minutes to 1 hour. In general, carbon dioxide becomes to be in a supercritical state at the temperature of 31° C. and at the pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

Also, the atmospheric drying process may be performed according to a typical method such as hot air drying and IR drying under a temperature of 70-200° C. and atmospheric pressure (1±0.3 atm).

As a result of the above drying process, a blanket including a porous aerogel having nano-sized pores may be manufactured. Particularly, the silica aerogel according to an embodiment of the present invention has excellent physical properties together with high hydrophobicity, especially low tap density and high porosity, and a silica aerogel containing blanket including the same has excellent mechanical flexibility together with low thermal conductivity.

In addition, before or after the drying process, a compression process to control the thickness and make the internal structure and surface shape of a blanket uniform, a molding process to have a suitable shape or morphology according to use, or a lamination process for laminating a separate functional layer may be further performed.

In addition, according to an embodiment of the present invention, the method for manufacturing an aerogel blanket may include introducing a substrate for the blanket into a reaction vessel, introducing a catalyzed sol into the reaction vessel into which the substrate for the blanket is introduced, performing gelation while rotating the reaction vessel, and drying the gelled wet gel blanket. At this time, the substrate for the blanket may be a porous substrate obtained by rolling a fibrous batting material on a fiber-roll preform having a plurality of fiber layers.

In addition, the reaction vessel may be rotated at a rate of 10 rpm to 400 rpm to perform gelation.

Also, the present invention provides an aerogel blanket manufactured by the method for manufacturing an aerogel blanket according to the present invention, and specifically, provides a silica aerogel blanket manufactured according to the manufacturing method described above.

Specifically, the blanket includes an aerogel on at least one side and inside a substrate for the blanket. More specifically, the aerogel may be included in an amount of 20-80 wt % based on the total weight of the blanket. As the content of aerogel in the blanket increases, the thermal insulation increases. However, when the content of aerogel in the blanket exceeds 80 wt %, the strength and adhesion force of the blanket may be deteriorated due to the low strength and adhesion force of the aerogel itself. Also, when the content of aerogel in the blanket is too low, specifically less than 20 wt %, the thermal insulation may be deteriorated.

According to an embodiment of the present invention, by including a step of performing gelation by rotating a reaction vessel during the manufacturing of an aerogel blanket, a large amount of aerogel particles are evenly coated on a substrate for the blanket, so that an improved thermal conductivity of 10-20 mW/mK may be obtained.

The thermal conductivity is a value measured at room temperature (20±5° C.) in accordance with a heat flow method using the HFM 436 Lambda equipment of NETZSCH Co., Ltd.

Accordingly, the aerogel blanket of the present invention may be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

Hereinafter, Examples of the present invention will be described in detail so that those skilled in the art may easily carry out the present invention. However, the present invention may be embodied in many different forms, and is not limited to Examples set forth herein.

Example 1

Tetraethyl orthosilicate (TEOS) and water were mixed in a molar ratio of 1:4 and ethanol having a weight ratio of 1:5 with TEOS was added thereto to prepare a silica precursor solution. In order to facilitate hydrolysis, hydrochloric acid was added such that the pH of the silica precursor solution is 3 or less. $TiO_2$, an opaque agent having a weight ratio of 0.2 based on the silica precursor solution and Ultracarb (LKAB Co., Ltd), a flame retardant, were mixed and then stirred for 30 minutes. An ammonia ethanol solution of 1 vol % (base catalyst solution) was prepared and the silica precursor solution and the base catalyst solution were mixed at a volume ratio of 9:1 to prepare a silica sol. 3 L of the silica sol was introduced into a 5 L reaction vessel. A porous 10 T (10 mm) glass fiber was introduced into the reaction vessel in the same volume as the silica sol and then sealed. Thereafter, the reaction vessel was rotated at a rate of 150 rpm in the state of being laid down to perform gelation for 20 minutes. A wet gel blanket completed with gelation was recovered from the reaction vessel and then added to an ammonia ethanol dilution solution of 5 vol % to be aged for 100 minutes at a temperature of 70° C. After the aging, a hydrophobization reaction was performed for 8 hours in a hexamethyldisilazane (HMDS) ethanol dilution solution of 10 vol %. After the hydrophobization reaction was completed, the wet gel blanket was placed in a supercritical extractor and $CO_2$ was injected thereto. Thereafter, the temperature inside the extractor was raised to 60° C. over 1 hour, and supercritical drying was performed at 60° C. and 100 bar. The hydrophobic silica aerogel blanket completed with supercritical drying was subjected to atmospheric drying in an oven of 200° C. for 2 hours to completely remove remaining salts and water to manufacture a hydrophobic silica aerogel blanket.

Examples 2 to 3

A hydrophobic silica aerogel blanket was manufactured in the same manner as in Example 1 except that the thickness of the fiber was changed according to the conditions listed in Table 1 below.

Example 4

A hydrophobic silica aerogel blanket was manufactured in the same manner as in Example 1 except that the wet gel blanket completed with gelation was not recovered from the reaction vessel and the aging and surface modification were performed in the reaction vessel.

Examples 5 to 7

A hydrophobic silica aerogel blanket was manufactured in the same manner as in Example 1 except of the rotation rate of the reaction vessel was changed according to the conditions of Table 1 below.

Comparative Example 1

A hydrophobic silica aerogel blanket was produced in the same manner as in Example 1 except that the reaction vessel was not rotated.

Comparative Example 2

The same method was performed in the same manner as in Example 1 except that glass, which is a non-compressible and non-porous substrate, was introduced into the reaction vessel instead of the porous glass fiber. However, since the silica sol could not be impregnated on the substrate, it was impossible to manufacture an aerogel blanket.

Experimental Example 1: Confirmation of Aerogel Blanket Appearance

The aerogel blanket prepared in each of Examples 1 to 2 and Comparative Example 2 was photographed and the photographs are shown in FIG. 1 to FIG. 3B.

Figure 1:
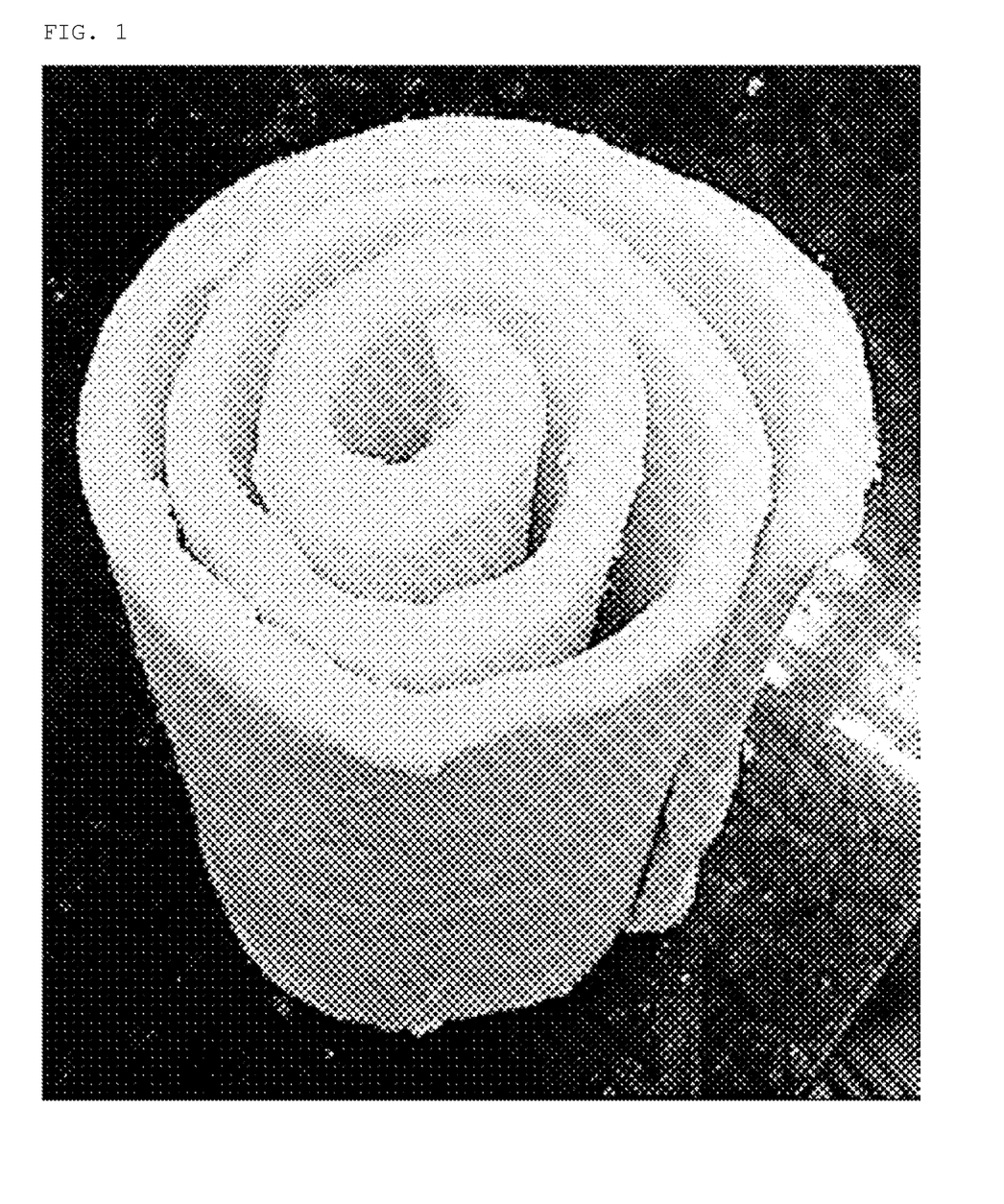
FIG. 1 is a photograph of an aerogel blanket manufactured in Example 1 of the present invention.
Figure 2:
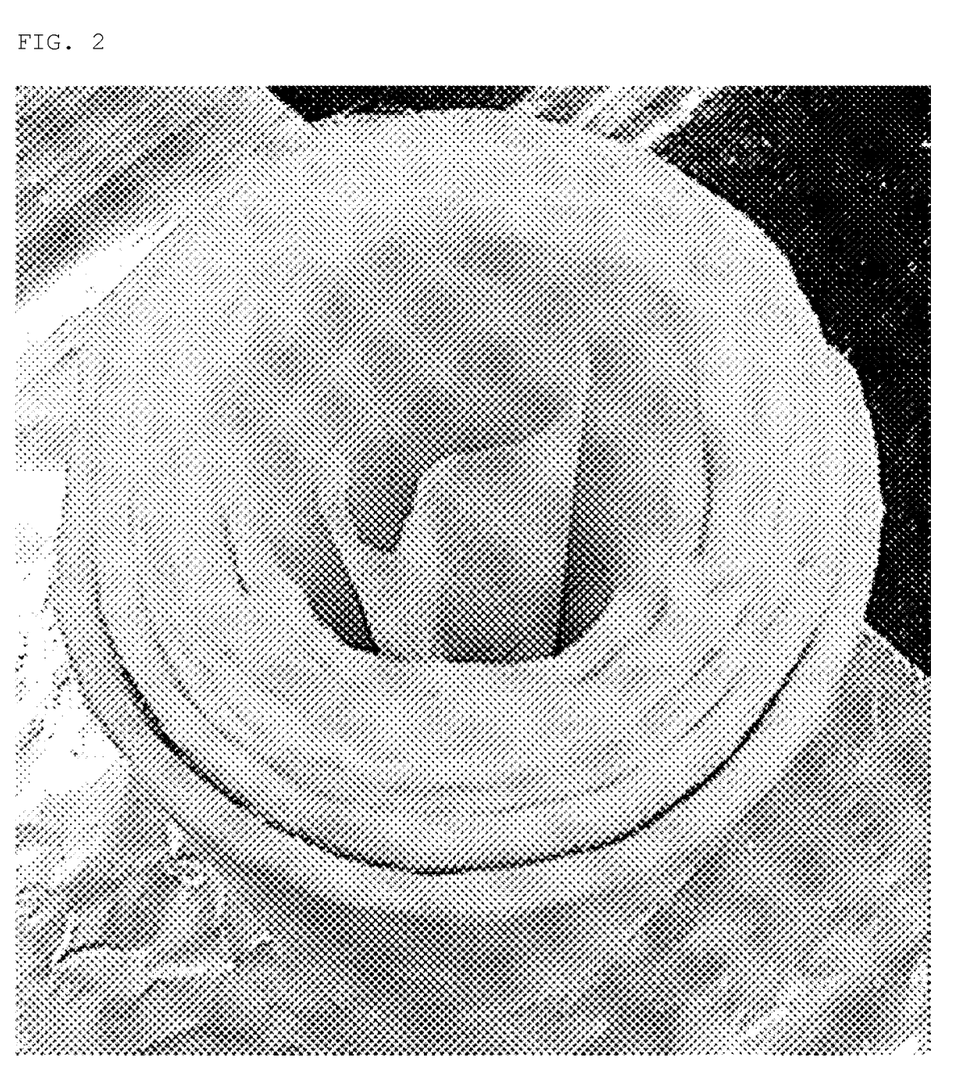
FIG. 2 is a photograph of an aerogel blanket manufactured in Example 2 of the present invention.
Figure 3A:
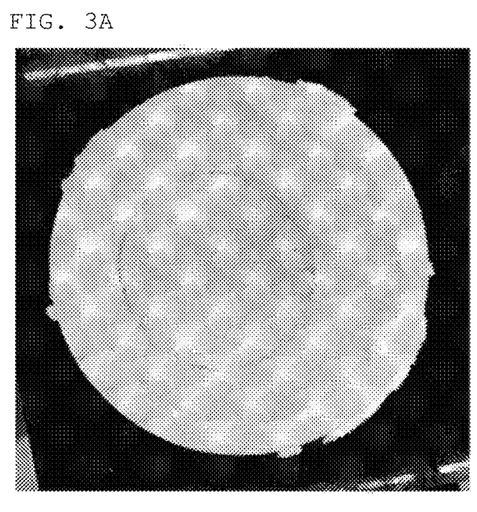
FIGS. 3A and 3B are each a photograph taken of the interior (3A) and the contents (3B) of a reaction vessel after the completion of a gelation reaction in Comparative Example 2 of the present invention.
Figure 3B:
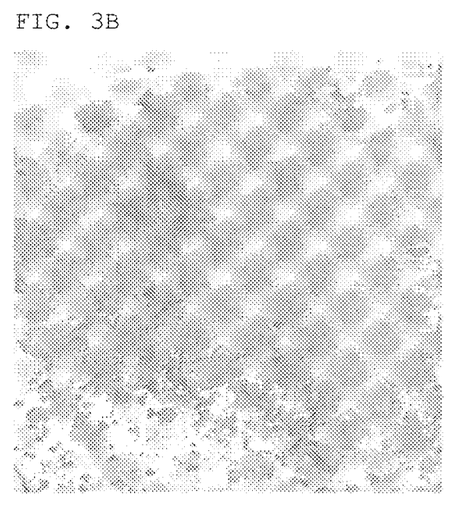

As shown in FIG. 1 to FIG. 3B, in the aerogel blanket (see FIG. 1 and FIG. 2) of each of Example 1 and Example 2 manufactured by the manufacturing method according to an embodiment of the present invention, the silica sol was impregnated in the substrate for the blanket and then gelation was performed, so that it was possible to visually confirm the formation of an aerogel inside the substrate. However, in Comparative Example 2 in which glass, which is not porous and is a non-compressible substrate, was used, the silica sol could not be impregnated into the substrate for the blanket, so that it was not possible to manufacture an aerogel blanket. It can be confirmed that the sol was precipitated as an insoluble silica salt or formed into a powdered aerogel as shown in FIGS. 3A and 3B. FIG. 3A is a photograph taken of the inside of the reaction vessel, and it can be confirmed that an aerogel was not formed inside the substrate but was present as a powdered aerogel inside the reaction vessel. 3B is a photograph taken of the contents formed in the reaction vessel, and it can be confirmed that an aerogel in the form of powder was formed.

Experimental Example 2: Measurement of Thickness and Thermal Conductivity of Aerogel Blanket A sample of a size of 30 cm×30 cm was prepared for the aerogel blanket manufactured in each of Examples and Comparative Examples, and the thickness and the thermal conductivity at room temperature (20±5° C.) of the sample was measured using the HFM 436 Lambda equipment of NETZSCH Co., Ltd.

TABLE 1

|  | Fiber Thickness (mm) | Rotation rate of reaction vessel (rpm) | Thickness of aerogel blanket (mm) | Lowest thermal conductivity value in sample (mW/mK) | Highest thermal conductivity value in sample (mW/mK) |
| --- | --- | --- | --- | --- | --- |
| Example 1 | 10 | 150 | 10.8 | 17.8 | 18.1 |
| Example 2 | 5 | 150 | 4.9 | 16.2 | 16.3 |
| Example 3 | 3 | 150 | 3.2 | 14.9 | 15.5 |
| Example 4 | 10 | 150 | 10.1 | 17.6 | 17.7 |
| Example 5 | 10 | 30 | 10.5 | 18.0 | 18.2 |
| Example 6 | 10 | 300 | 10.7 | 18.2 | 18.8 |
| Example 7 | 10 | 350 | 11.3 | 18.3 | 23.2 |
| Comparative Example 1 | 10 | 0 | 8.9-12.3 | 20.4 | 30.5 |
| Comparative Example 2 | — | 150 | Not measurable | Not measurable | Not measurable |

As shown in Table 1 above, Examples 1 to 7 in which a porous substrate for the blanket was used and gelation was performed while rotating the reaction vessel in which the gelation was performed, it can be confirmed that, compared to Comparative Examples 1 and 2 which do not satisfy the above conditions, the thickness of the manufactured aerogel blanket was constant, the room temperature thermal conductivity value was even lower, and the deviation between the lowest value and highest value of the thermal conductivity was not large, thereby exhibiting uniform thermal conductivity.

In addition, from Table 1 above, it can be confirmed that in the case of Comparative Example 2 in which a porous substrate for the blanket was not used, the sol could not be impregnated into the substrate, so that it was impossible to manufacture an aerogel blanket.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for manufacturing an aerogel blanket, the method comprising:
   (Step 1) introducing a catalyzed sol and a substrate for the blanket into a reaction vessel, and
   (Step 2) performing gelation while rotating the reaction vessel,
   wherein the substrate for the blanket is a porous substrate, and
   wherein the catalyzed sol is introduced in an amount of 80-120% based on the volume of the substrate for the blanket.

2. The method of claim 1, wherein the reaction vessel in Step 2 is rotated at a rate of 10 rpm to 400 rpm.

3. The method of claim 1, wherein the rotation in Step 2 is performed by disposing the long axis of the reaction vessel in a lateral direction.

4. The method of claim 1, wherein the reaction vessel is a reaction vessel in a cylindrical shape.

5. The method of claim 1, wherein the substrate for the blanket is a film, a sheet, a net, a fiber, a foam, a non-woven body, or a laminate of two or more layers thereof.

6. The method of claim 1, wherein the catalyzed sol is a catalyzed silica sol.

7. The method of claim 1, further comprising an aging step and a surface modification step after Step 2.

8. The method of claim 7, wherein the aging step and the surface modification step are performed inside the reaction vessel.

9. The method of claim 1, further comprising a drying step after Step 2,
   wherein the drying step is performed by supercritical drying, or by an atmospheric drying process performed under the conditions of a pressure of 1±0.3 atm and a temperature of 70° C. to 200° C.

10. A method for manufacturing an aerogel blanket, the method comprising:
    introducing a substrate for the blanket into a reaction vessel;
    introducing a catalyzed sol into the reaction vessel into which the substrate for the blanket has been introduced;
    performing gelation while rotating the reaction vessel; and
    drying the gelled wet gel blanket, wherein the substrate for the blanket is a porous substrate obtained by rolling a fibrous batting material on a fiber-roll preform having a plurality of fiber layers,
    wherein the catalyzed sol is introduced in an amount of 80-120% based on the volume of the substrate for the blanket.

* * * * *